(12) United States Patent
Welk et al.

(10) Patent No.: US 6,964,478 B2
(45) Date of Patent: Nov. 15, 2005

(54) PROGRESSIVE SPECTACLE LENS

(75) Inventors: Andrea Welk, Munich (DE); Peter Baumbach, Munich (DE); Walter Haimerl, Munich (DE); Herbert Pfeiffer, Munich (DE); Gregor Esser, Munich (DE); Helmut Altheimer, Lauchdorf (DE); Rainer Dorsch, Munich (DE); Martin Zimmerman, Kleinberghofen (DE); Norbert Awrath, Munich (DE); Jochen Brosig, Gruenwald (DE); Werner Mueller, Oetisheim (DE); Martin Wechs, Munich (DE); Stephan Haser, Munich (DE); Winfried Nikolaus, Haar (DE)

(73) Assignee: Rodenstock GmbH, Munich (DE)

( * ) Notice: Subject to any disclaimer, the term of this patent is extended or adjusted under 35 U.S.C. 154(b) by 91 days.

(21) Appl. No.: 10/279,040

(22) Filed: Oct. 24, 2002

(65) Prior Publication Data

US 2004/0017543 A1 Jan. 29, 2004

Related U.S. Application Data

(63) Continuation of application No. PCT/DE01/01582, filed on Apr. 25, 2001.

(30) Foreign Application Priority Data

| Apr. 25, 2000 | (DE) | 100 20 244 |
| Apr. 25, 2000 | (DE) | 100 20 241 |
| Apr. 28, 2000 | (DE) | 100 21 047 |
| Jan. 17, 2001 | (DE) | PCT/DE01/00188 |

(51) Int. Cl.[7] .................................................. G02C 7/06
(52) U.S. Cl. ....................................................... 351/169
(58) Field of Search .................................. 351/168–172

(56) References Cited

U.S. PATENT DOCUMENTS

| 4,606,622 | A | 8/1986 | Fueeter et al. ............... 351/169 |
| 5,488,442 | A | 1/1996 | Harsigny et al. ........... 351/169 |
| 5,784,144 | A | 7/1998 | Kelch et al. ................. 351/169 |
| 5,992,998 | A | 11/1999 | Pfeiffer et al. .............. 351/169 |
| 6,669,337 | B2 * | 12/2003 | Welk et al. .................. 351/169 |

FOREIGN PATENT DOCUMENTS

| DE | 42 38 067 A1 | 5/1993 |
| DE | 43 42 234 A1 | 6/1994 |
| DE | 196 12 284 A1 | 10/1997 |
| EP | 0 677 177 B1 | 6/2001 |

* cited by examiner

*Primary Examiner*—Scott J. Sugarman
(74) *Attorney, Agent, or Firm*—Crowell & Moring LLP

(57) ABSTRACT

A spectacle lens is provided with a region (distance portion) designed for viewing at greater distances and, in particular, "to infinity", a region (near portion) designed for viewing at short distances and, in particular, "reading distances", and a progression zone disposed between the distance portion and the near portion, in which the power of the spectacle lens increases from the value in the distance reference point located in the distance portion to the value at the near reference point located in the near portion along a line (principal meridian) curving towards the nose. The invention is marked by specific conditions for the astigmatic deviation and/or the mean "as worn" power being observed.

2 Claims, 8 Drawing Sheets

FIG. 4 a

Vertex Heights:

| 0 | -20 | -17.5 | -15 | -12.5 | -10 | -7.5 | -5 | -2.5 | 0 |
|---|---|---|---|---|---|---|---|---|---|
| 20 | 0 | 0 | 0 | 0 | 0 | 0 | 0 | 0 | 1.88114 |
| 17.5 | 0 | 0 | 0 | 0 | 0 | 1.727544 | 1.572749 | 1.476457 | 1.43867 |
| 15 | 0 | 0 | 0 | 1.825893 | 1.556258 | 1.343761 | 1.189465 | 1.093506 | 1.055966 |
| 12.5 | 0 | 0 | 1.827844 | 1.500623 | 1.231244 | 1.019591 | 0.865786 | 0.770078 | 0.732707 |
| 10 | 0 | 0 | 1.558189 | 1.232921 | 0.965089 | 0.754524 | 0.601373 | 0.505935 | 0.468649 |
| 7.5 | 0 | 1.726383 | 1.345574 | 1.022576 | 0.756795 | 0.547868 | 0.39579 | 0.300844 | 0.263672 |
| 5 | 0 | 1.566588 | 1.188478 | 0.868198 | 0.605063 | 0.398525 | 0.248337 | 0.154463 | 0.117588 |
| 2.5 | 0 | 1.459495 | 1.084527 | 0.767617 | 0.508048 | 0.305076 | 0.15802 | 0.066273 | 0.030092 |
| 0 | 1.833183 | 1.402774 | 1.031483 | 0.718726 | 0.463772 | 0.26566 | 0.123183 | 0.035027 | 0.00048 |
| -2.5 | 0 | 1.394456 | 1.027487 | 0.719736 | 0.470458 | 0.278427 | 0.141793 | 0.058484 | 0.026833 |
| -5 | 0 | 1.432945 | 1.070942 | 0.768862 | 0.525984 | 0.340808 | 0.210844 | 0.133162 | 0.105213 |
| -7.5 | 0 | 1.51707 | 1.160674 | 0.864715 | 0.628528 | 0.450405 | 0.32724 | 0.255205 | 0.230946 |
| -10 | 0 | 0 | 1.296365 | 1.00678 | 0.777293 | 0.605921 | 0.488983 | 0.42183 | 0.400599 |
| -12.5 | 0 | 0 | 1.479087 | 1.195879 | 0.972726 | 0.807223 | 0.695213 | 0.631598 | 0.61234 |
| -15 | 0 | 0 | 0 | 1.43296 | 1.214957 | 1.053701 | 0.944992 | 0.883608 | 0.86536 |
| -17.5 | 0 | 0 | 0 | 0 | 0 | 1.344445 | 1.237531 | 1.177299 | 1.159499 |
| -20 | 0 | 0 | 0 | 0 | 0 | 0 | 0 | 0 | 1.494969 |

| 0 | 2.5 | 5 | 7.5 | 10 | 12.5 | 15 | 17.5 | 20 |
|---|---|---|---|---|---|---|---|---|
| 20 | 0 | 0 | 0 | 0 | 0 | 0 | 0 | 0 |
| 17.5 | 1.459338 | 1.538288 | 1.675159 | 0 | 0 | 0 | 0 | 0 |
| 15 | 1.076827 | 1.155872 | 1.292618 | 1.4865 | 1.737064 | 0 | 0 | 0 |
| 12.5 | 0.753727 | 0.832805 | 0.969293 | 1.162491 | 1.41186 | 1.717203 | 0 | 0 |
| 10 | 0.489795 | 0.568789 | 0.704732 | 0.896843 | 1.144544 | 1.447722 | 0 | 0 |
| 7.5 | 0.28482 | 0.36345 | 0.498312 | 0.688619 | 0.933952 | 1.234434 | 1.590531 | 0 |
| 5 | 0.138583 | 0.216248 | 0.349126 | 0.536661 | 0.778744 | 1.075794 | 1.428451 | 0 |
| 2.5 | 0.050725 | 0.126539 | 0.256119 | 0.439446 | 0.677017 | 0.969632 | 1.318088 | 0 |
| 0 | 0.020498 | 0.093392 | 0.218221 | 0.395724 | 0.62728 | 0.914254 | 1.257604 | 1.658066 |
| -2.5 | 0.046199 | 0.115437 | 0.23443 | 0.404667 | 0.628679 | 0.908687 | 1.245883 | 0 |
| -5 | 0.124484 | 0.189993 | 0.302891 | 0.46531 | 0.680802 | 0.952663 | 1.282563 | 0 |
| -7.5 | 0.250899 | 0.313413 | 0.420938 | 0.576172 | 0.783244 | 1.046462 | 1.368183 | 0 |
| -10 | 0.421421 | 0.482323 | 0.585923 | 0.735457 | 0.935213 | 1.190203 | 0 | 0 |
| -12.5 | 0.633866 | 0.694298 | 0.795689 | 0.941459 | 1.135746 | 1.383841 | 0 | 0 |
| -15 | 0.887307 | 0.974892 | 1.048564 | 1.192212 | 1.38304 | 0 | 0 | 0 |
| -17.5 | 1.181572 | 1.242623 | 1.343387 | 0 | 0 | 0 | 0 | 0 |
| -20 | 0 | 0 | 0 | 0 | 0 | 0 | 0 | 0 |

PROGRESSIVE SPECTACLE LENS

CROSS REFERENCE TO RELATED APPLICATIONS

The present application is a continuation of International Patent Application No. PCT/DE01/01582, filed Apr. 25, 2001, designating the United States of America, the entire disclosure of which is incorporated herein by reference. Priority is claimed based on German Patent Application Nos. 100 20 241.1, filed Apr. 25, 2000; 100 20 244.6, filed Apr. 25, 2000; and 100 21 047.3, filed Apr. 28, 2000; and International Patent Application No. PCT/DE01/00188, filed Jan. 17, 2001.

FIELD OF THE INVENTION

The present invention relates to a progressive spectacle lens.

BACKGROUND OF THE INVENTION

Progressive spectacle lenses (also called varifocal lenses, multifocal lenses etc.) are usually understood to be spectacle lenses having a different (smaller) power in the region through which a spectacle wearer views an object located at a greater distance—hereunder designated as a distance portion—than in the region (near portion) through which the spectacle wearer views a near object.

Located between the distance portion and the near portion is the so-called progressive zone in which the power of the spectacle lens continuously increases from that of the distance portion to that of the near portion. The magnitude of the power increase is also designated as the power addition.

As a rule the distance portion is located in the upper part of the spectacle lens and designed for viewing "to infinity", whilst the near portion is located in the lower region and is particularly designed for reading. In spectacles for special applications—those for pilots or for monitor work stations are mentioned as examples—the distance and near portions may also be arranged differently and/or designed for other distances. Furthermore, it is possible for a plurality of near portions and/or distance portions and corresponding progression zones to be present.

With progressive spectacle lenses having a constant refractive index it is necessary for the increase of power between the distance portion and the near portion that the curvature of one or both surfaces continuously change from the distance portion to the near portion.

The surfaces of spectacle lenses are usually characterized by the so-called principal radii of curvature R1 and R2 at every point of the surface. (Sometimes also the principal curvatures k1=1/R1 and K2=1/R2 are stated instead of the principal radii of curvature). Together with the refractive index n of the glass material, the principal radii of curvature determine the parameters frequently used for an ophthalmologic characterization of a surface:

Surface power=$0.5 \cdot (n-1) \cdot (1/R1+1/R2)$

Surface astigmatism=$(n-1) \cdot (1/R1-1/R2)$.

The surface power is the parameter via which an increase of the power from the distance portion to the near portion is achieved. The surface astigmatism (lucidly termed cylinder power) is a "disturbing property", because an astigmatism—inasmuch as an eye does not have an innate astigmatism to be corrected—exceeding a value of about 0.5 dpt results in an image on the retina which is seen to be indistinct.

Although any change of the curvature of the surface which is needed to achieve a surface power increase without vision being "disturbed" by surface astigmatism can be attained relatively simply along a (plane or curved) meridian, considerable "intersections" of surfaces will result alongside this meridian, leading to a large surface astigmatism which more or less impairs the lens in regions alongside the mentioned meridian.

With a surface having a surface power increasing from the distance portion to the near portion it is therefore not possible for reasons of surface theory to "maintain" the regions alongside a meridian (that is free from astigmatism or exhibits a predetermined astigmatism) free from physiologically disturbing surface astigmatism (Minkwitz Proposition).

Because the curvature in the distance portion must not change, it is relatively simple to design the distance portion of the progressive surface in such manner that the distance portion has a very small surface astigmatism (<0.5 dpt) or even a surface astigmatism value of "0" within a large region. On the other hand, the "quality" of the shaping of the regions lateral to the transition region is of decisive importance for the acceptability of the spectacle lens to the spectacle wearer concerned.

The basic object in designing every progressive spectacle lens is therefore to shape the lateral regions within the transition zone, as well as the lateral regions of the near portion if necessary, so that the spectacle lens will be as acceptable as possible to the spectacle wearer—without any unacceptable impairment of the distance portion.

In order to achieve this basic object, the designing of a progressive spectacle lens surface contributing to power change has in the past started out from a meridian lying or curving in a plane—also designated as a principal meridian or a principal line—as a "backbone for the design of the surface". This meridian extends centrally along the surface from top to bottom, and its course approximately follows the point of penetration of the viewing rays through the spectacle lens surface during a shifting of the gaze and, in particular, a lowering of the gaze. The principal curvatures of every point of this meridian have been chosen so that the desired increase of surface power (also designated as addition power) from the distance portion to the near portion is achieved. Starting out from this meridian, the lateral regions of the surface have then been (more or less) suitably calculated.

For the shaping of the lateral regions a number of solutions have become known. During the early days of the calculation of progressive spectacle lenses a purely surface theoretical optimization of exclusively the progressive surface was performed, in which the foremost concern was that of substantially reducing as far as possible the disturbing surface astigmatism, or "displacing" the surface astigmatism into the lateral lower regions of the spectacle lens Typical of this manner of proceeding are the progressive surfaces for spectacle lenses known from U.S. Pat. No. 2,878,721 or DE-AS 20 44 639, in which—provided that the progressive surface is the front surface—the curvatures of intersections of the progressive surface with plane surfaces which extend horizontally (horizontal sections) or are perpendicular to the principal meridian (orthogonal sections) are conic sections or curves of higher order, the curvature of which increases in the distance portion and decreases in the near portion. The transition between the increase of curvature of the sections in the distance portion and the decrease in the near portion occurs in the progressive zone.

This manner of proceeding results in the power difference and therewith also the surface intersections being decreased in the lateral regions. However, it is of disadvantage that because of the decrease of the power difference in the lateral regions an orientation of view through the edge region is rendered difficult and—according to the design—very disturbing swaying effects are experienced when looking through the lateral regions. Furthermore, the surface power along horizontal sections changes relatively strongly.

For this reason it was proposed in DE-Patent 28 14 936 that the curvature in the distance portion or in the near portion be allowed to decrease or increase only in a strip on both sides of the principal meridian, and that the change of curvature be reversed outside this strip.

However, common to all these approaches is a purely surface-related optimization of the progressive surface. This purely surface-related approach can be found also in more recent patent publications, such as DE-C-42 38 067 or DE-C-43 42 234.

In the last-mentioned publication an approach is described in which certain conditions for the gradient of the surface astigmatism and the surface power must be maintained. Irrespective of the circumstance that these gradients are not at all defined, for example when the surface is described by means of cubic splines, this purely surface-related optimization also disregards certain physiological prerequisites.

Approaches made to optimize the progressive surface in a wearing position are described in EP-A-677 177, U.S. Pat. No. 4,606,622 and DE 196 12 284.

For calculating a progressive surface in the wearing position, a wearing situation is established. This relates either to a particular user for whom the individual parameters have been specially determined in the respective wearing situation and the progressive surface has been separately calculated and fabricated, or to average values as described for example in DIN 58 208 Part 2.

However, even the known spectacle lenses which have been calculated for the wearing position have a number of disadvantages:

Thus, with the progressive surfaces known from U.S. Pat. No. 4,606,622 peaks are present along the course of lines of equal surface astigmatism for the lines having a surface power value of 5 dpt and 7 dpt.

Possibly the reason for this may be that surface related and wearing position related approaches have been mixed in the calculation.

DE-A-196 12 284 deals with a decrease of the mean power in the near portion towards the periphery. This is an inadequate approach, because also in the distance portion the power should not increase excessively towards the periphery.

SUMMARY OF THE INVENTION

The invention is based on an object of further developing a progressive spectacle lens in such manner that it will not only have a large distance portion and a large near portion, but also that the decrease of the mean "as worn" power in the near portion as well as the increase of the mean "as worn" power in the distance portion towards the periphery is very small, and/or that the deviation from the prescribed astigmatism is very small and not disturbing to the spectacle wearer.

Achievements of this object in accordance with the present invention are described hereinafter.

In accordance with the present invention no surface values are taken into consideration, but only parameters which relate to the wearing position, namely a deviation from the given astigmatism (0 dpt for an astigmatism-free eye, or the prescription concerning magnitude and cylinder axis), and the mean "as worn" power D as a measure of the "power" of the spectacle lens.

The mean "as worn" power D is the mean value of the reciprocals S'1 and S'2 of the back focal lengths minus the reciprocal S of the object distance, i.e. the front focal length $$D=0.5\times(S'1+S'2)-S$$

S'=reciprocal of the back focal length
S=reciprocal of the front focal length.

According to the invention, the following applies to the astigmatic deviations:

the astigmatic deviation along the principal meridian, i.e. the difference between the prescribed and the actual astigmatism, is less than 0.2 dpt, the maximum astigmatic deviation is less than 1.2 times the addition power (add), which is defined as the difference between the mean "as worn" powers at the distance reference point ($D_{BF}$) and the near reference point ($D_{BN}$), the maximum astigmatic deviation occurs on the nasal side of the principal meridian, the value of the maximum astigmatic deviation on the nasal side is at most 0.15 dpt greater than the value of the maximum astigmatic deviation on the temporal side.

The following applies to the mean "as worn" powers:

the mean "as worn" power $D_f$ in the region above the centration point $B_Z$, i.e. for $y>y(B_Z)$, is given by $$D_f \leq 0.4\cdot(\text{add})+D_{BF};$$

the "as worn" power DN in the region for which $y \ll (B_Z)-7$ mm is given by $$D_f \geq 0.25\cdot(\text{add})+D_{BF};$$

the spacing xA ($B_F$) of the iso-lines for an astigmatic deviation of 0.5 dpt at the level of the distance reference point, i.e. for $y=y(B_F)$, is given by $$xA\ (B_F) \geq 0.06/(\text{add});$$

the spacing xD ($B_F$) of the iso-lines for a deviation of 0.25 dpt from the mean "as worn" power in the distance reference point is given at the level of the distance reference point, i.e. for $y=y(B_F)$, by $$xD\ (B_F) \geq 0.04/(\text{add});$$

the spacing xA ($B_F$) of the iso-lines for an astigmatic deviation of 0.5 dpt at the level of the near reference point, i.e. for $y=y(B_N)$, is given by $$xA\ (B_N) \geq 0.015/(\text{add});$$

the spacing xA ($B_F$) of the iso-lines for a deviation of 0.25 dpt from the mean "as worn" power in the near reference point is given at the level of the near reference point, i.e. for $y=y(B_F)$, by $$xD\ (B_F) \geq 0.015/(\text{add}).$$

BRIEF DESCRIPTION OF THE DRAWINGS

In the following the invention will be described by way of example, without limitation of the general inventive concept, with the aid of embodiments with reference to the drawings to which attention is expressly drawn concerning the disclosure of all details of the invention not described more explicitly in the text.

DESCRIPTION OF EXAMPLES OF EMBODIMENT

Figure 1:
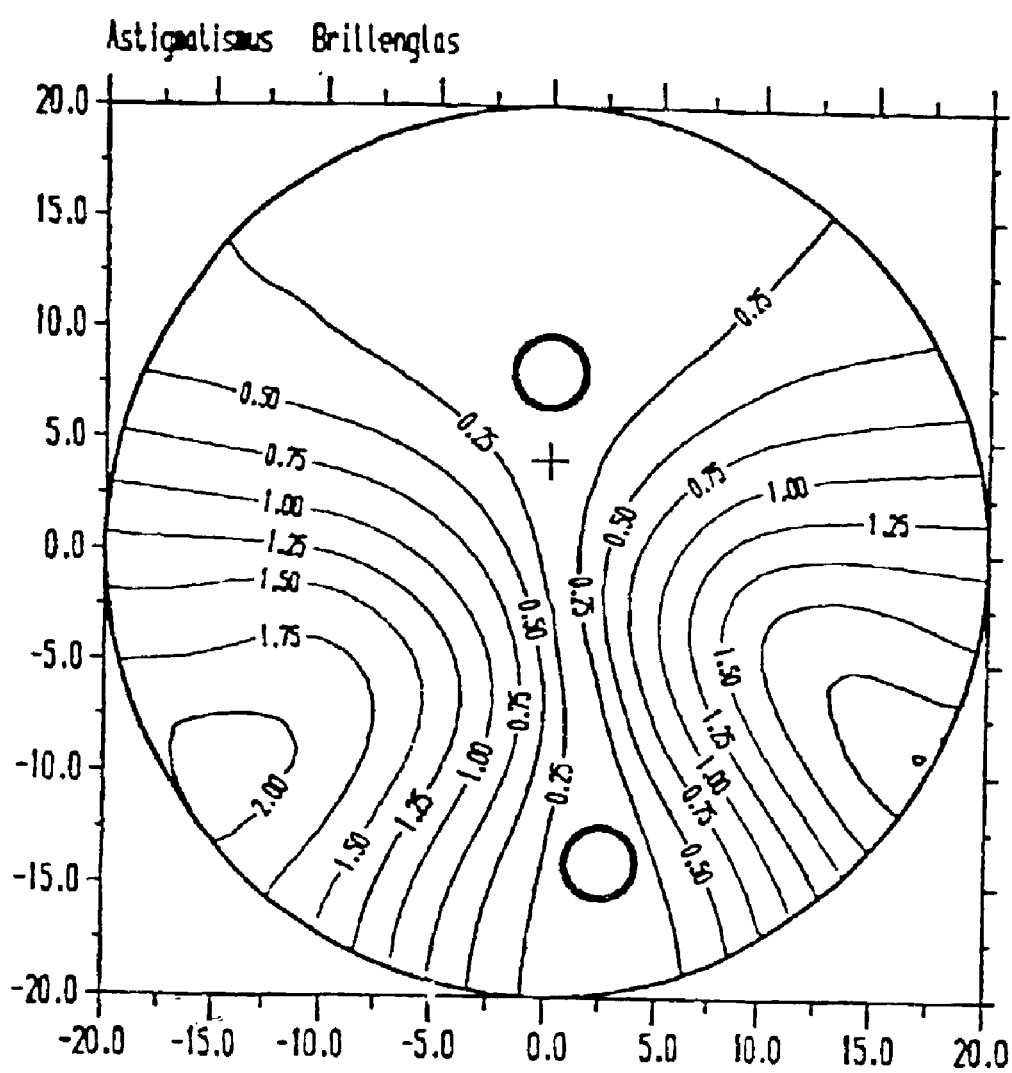
FIG. 1 shows the astigmatic deviation of a spectacle lens in accordance with the invention.
Figure 2:
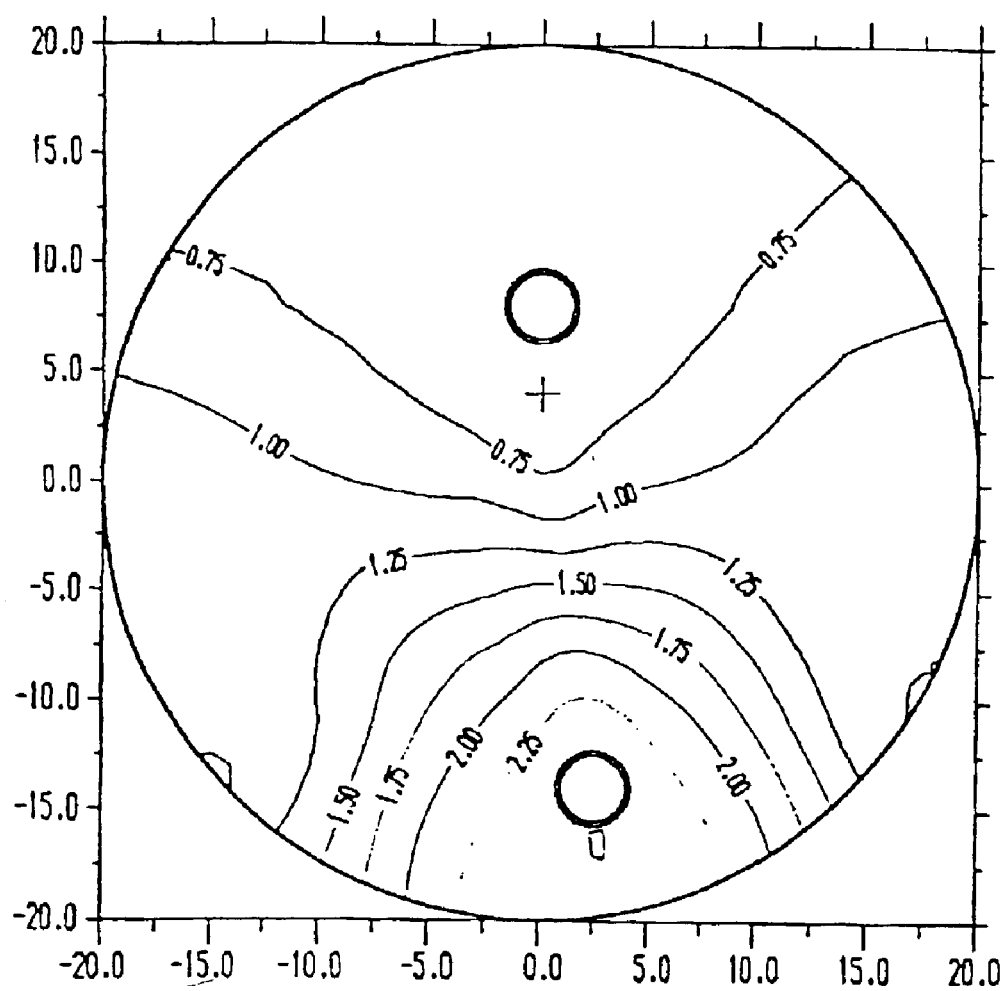
FIG. 2 shows the mean "as worn" power of this spectacle lens.

FIGS. 1 and 2 show the astigmatic deviation and the mean "as worn" power of an example of embodiment of the invention within a circle of 20 mm radius around a point lying 4 mm below the so-called centration point. The distance reference point and the near reference point are indicated by circles; their positions may be seen in the respective Figures.

In FIG. 1 the so-called astigmatic deviation, i.e. the "residual astigmatism" of the system spectacle lens/eye, is represented by so-called iso-lines, beginning with the iso-line 0.25 dpt. The iso-lines indicate the deviation of the astigmatism with respect to magnitude and cylinder axis from the cylindrical prescription—which is 0 dpt in the case of an eye free from astigmatism.

In FIG. 2 the mean "as worn" power D, i.e. the mean value of the reciprocals S'1 and S'2 of the back focal lengths minus the reciprocal of the object distance, that is the front focal length S, $$D=0.5\times(S'1+S'2)-S$$

is also shown in the form of so-called iso-lines, starting with the iso-line 0.75 dpt.

In both Figures the abscissa (x axis) is the horizontal axis, and the ordinate (y axis) is the vertical axis in wearing position.

The Figures show that the distance portion as well as the near portion are relatively large. Furthermore, the mean "as worn" power hardly increases towards the periphery in the distance portion and hardly decreases in the near portion. The maximum astigmatic deviation is very small, the difference between the maximum deviations on the nasal and temporal side being insignificant.

Figure 3:
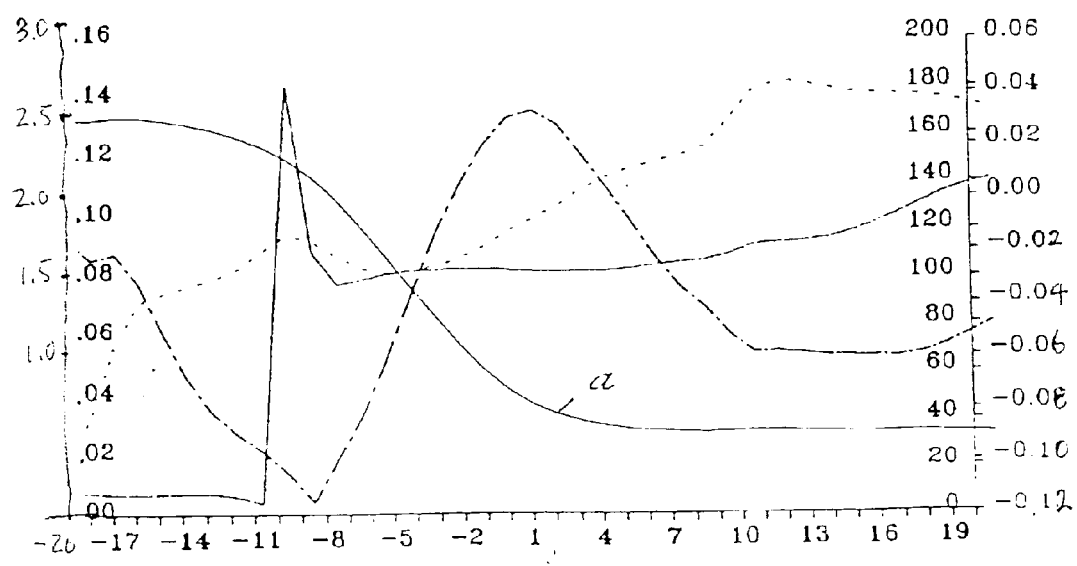
FIG. 3 shows the astigmatic deviation and the mean "as worn" power along the principal meridian.

FIG. 3 shows the following values along the principal meridian (the abscissa indicates the y values of the points on the principal meridian):
1. The increase of the mean "as worn" power in dpt: solid curve a, numbering on the ordinate from 0.0 to 3.0.
2. The cylinder axis of the astigmatic deviation in degrees: solid curve b, numbering on the ordinate from 0 to 200.
3. The astigmatic deviation in dpt: dash-dotted curve, numbering on the ordinate from 0.00 to 0.16.

Figure 4:
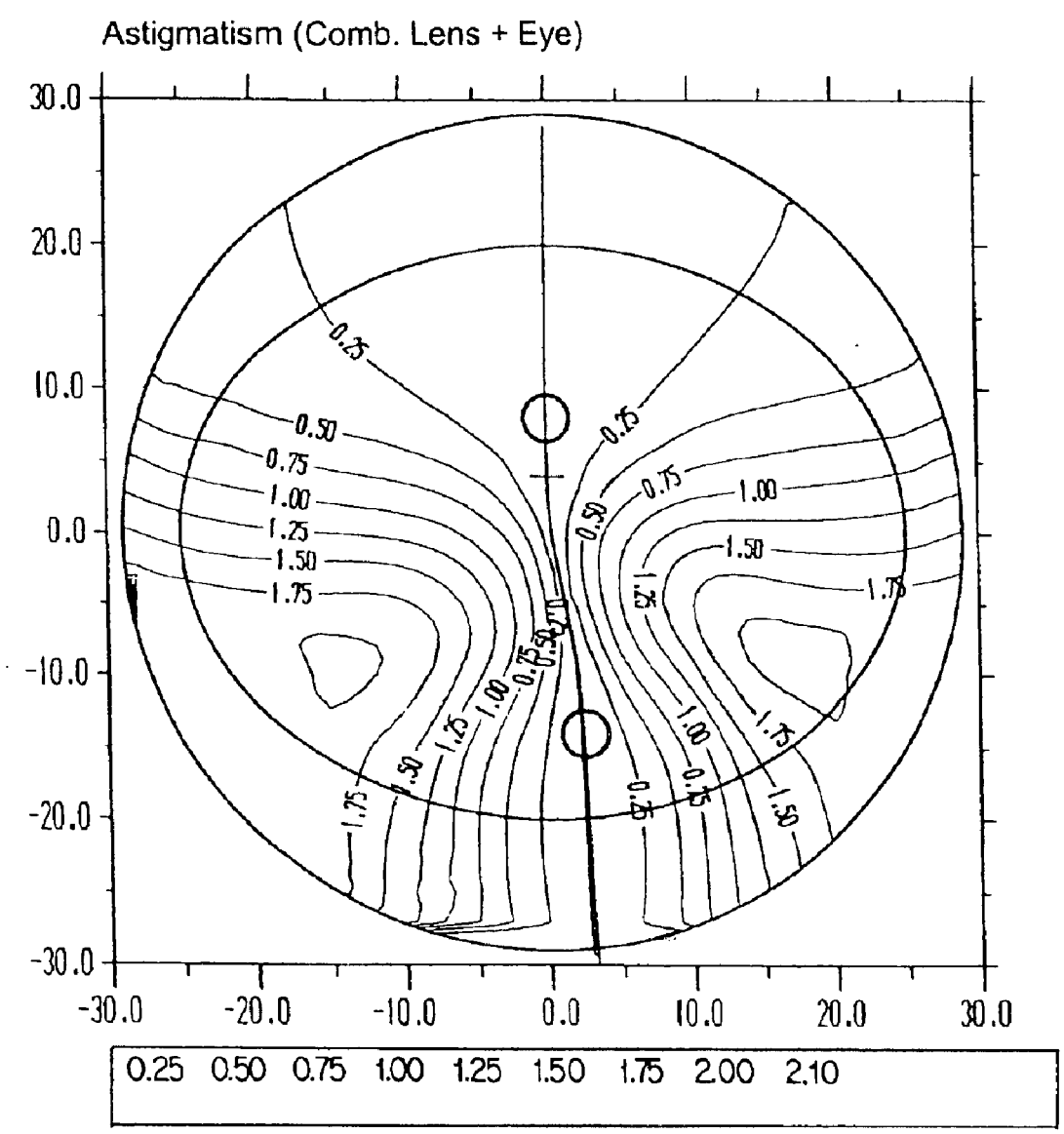
FIG. 4a shows the vertex height of the progressive surface of an actual example of embodiment.
FIG. 4b shows the iso-lines of the astigmatic deviation.
FIG. 4c shows the iso-lines of the mean "as worn" power.
FIG. 4d shows the iso-lines of the surface astigmatism.
FIG. 4e shows the iso-lines of the mean surface power of this example of embodiment.
Figure 4:
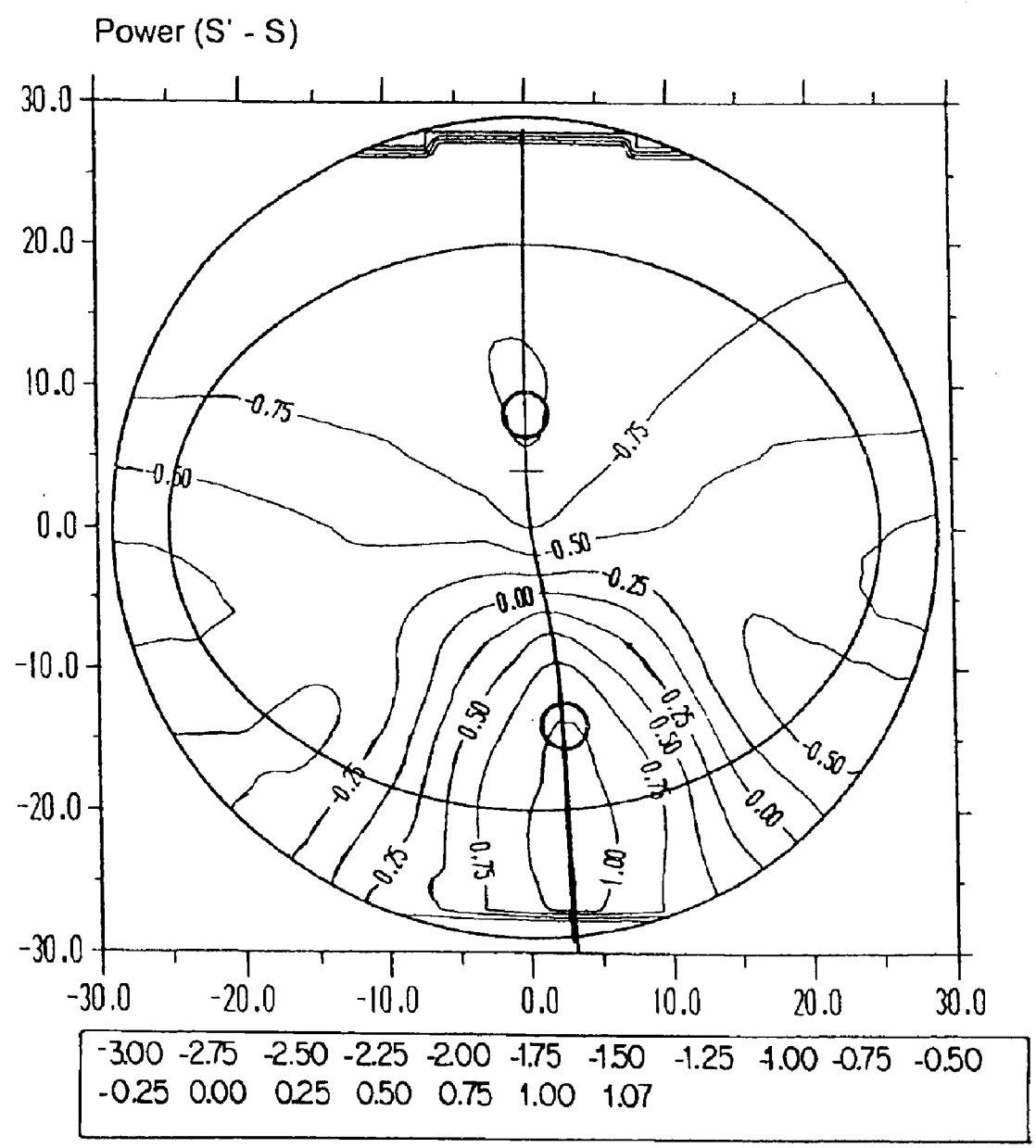
Figure 4:
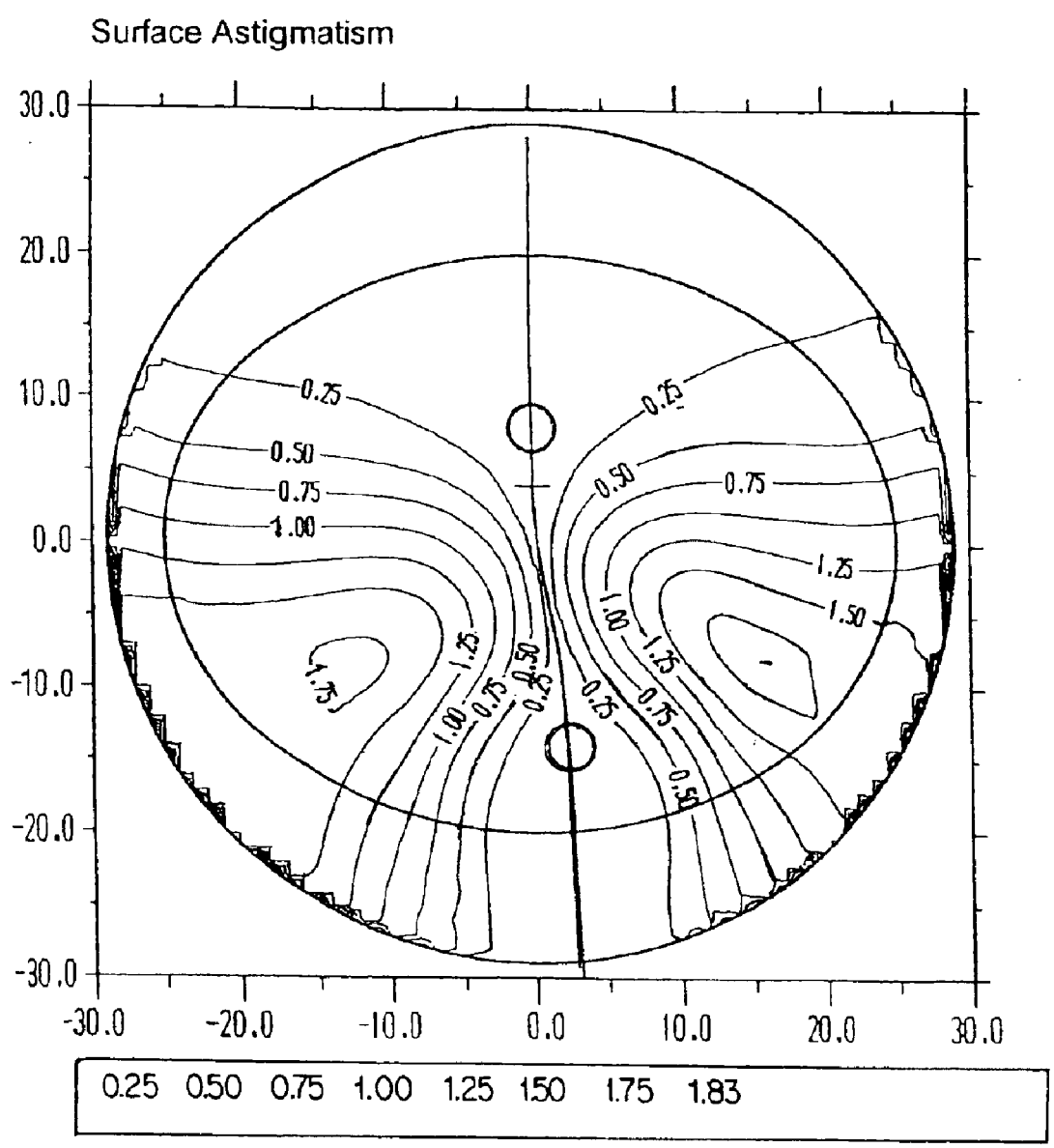
Figure 4:
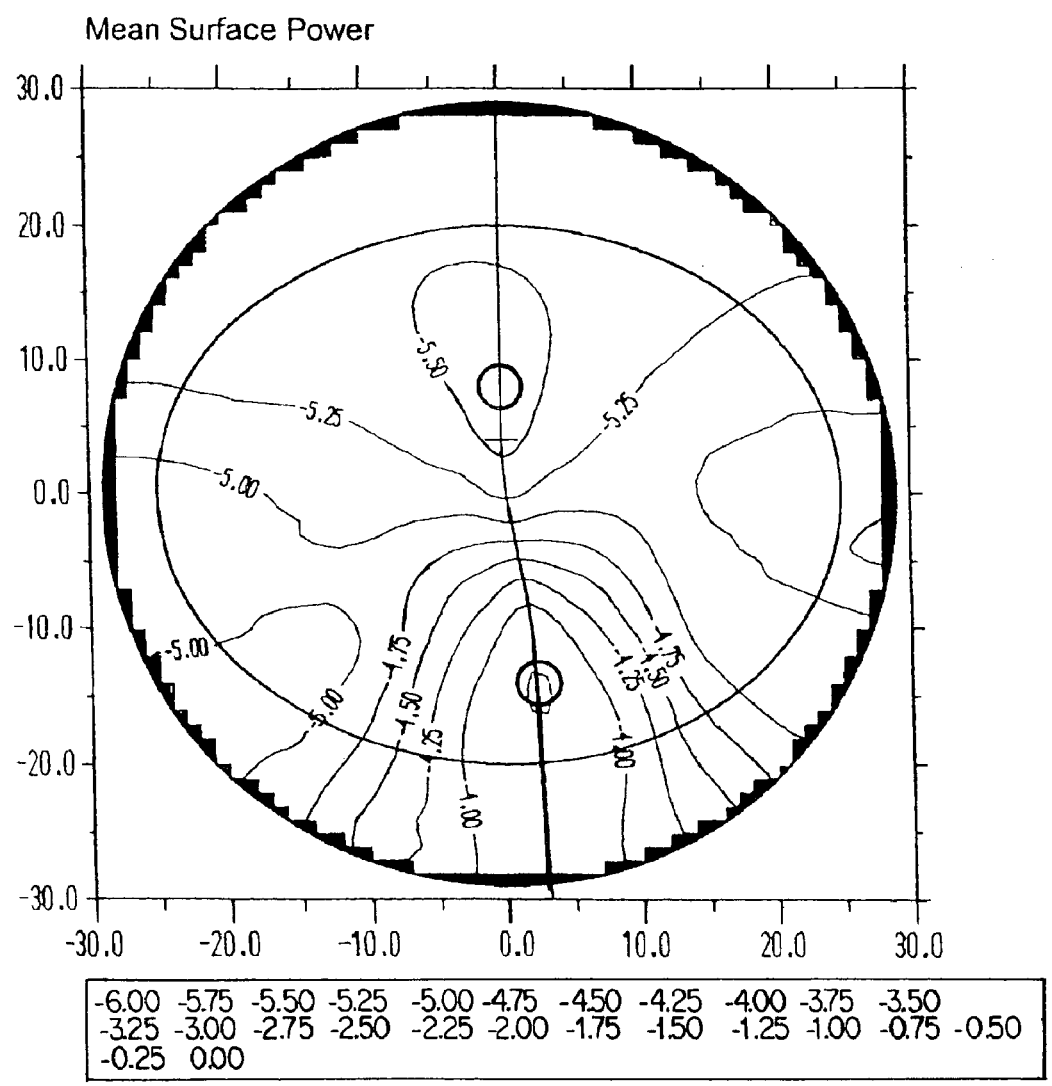

The actual example of embodiment described in FIG. 4 has a spherical power (mean "as worn" power) of −1 dpt and an addition power A of 2 dpt in the distance reference point. There is no astigmatic prescription. In all Figures the abscissa (x axis) is the horizontal axis and the ordinate (y axis) is the vertical axis in wearing position.

In FIGS. 4b–e the distance and the near reference point are each indicated by circles, the centration point is designated by a cross—their positions may be seen from the Figures. Furthermore, the course of the principal meridian is shown.

The partial FIG. 4a indicates the vertex height of the progressive back surface of the example of embodiment. Vertex height means the distance of a point having the coordinates x and y (horizontal and vertical axis, respectively, in the wearing position of the spectacle lens) from the tangential plane of the surface vertex. In the Table, the y values (from −20 to +20 mm) have been entered in each left-hand column, and the x values (from −20 to +20 mm) in each top row from column 2 onwards. The vertex heights are also given in millimeters. The value 0 means that no vertex height has been given for these x, y coordinates.

The partial FIG. 4b shows the astigmatic deviation within a circle of 30 mm radius around a point lying 4 mm below the so-called centration point. The astigmatic deviation is the "residual astigmatism" of the system spectacle lens/eye and is represented by means of so-called iso-lines beginning with the iso-line 0.25 dpt. The iso-lines indicate the deviation of the astigmatism with respect to magnitude and cylinder axis from the cylindrical prescription—which is 0 dpt in the case of an eye free of astigmatism.

The partial FIG. 4c accordingly shows the iso-lines for the mean "as worn" power of this example of embodiment. The mean "as worn" power D is the mean value of the reciprocals of the back focal lengths S'1 and S'2 minus the reciprocal of the object distance, i.e. the object side focal length S $$D=0.5\times(S'1+S'2)-S$$

and is also represented in the form of so-called iso-lines beginning with the iso-line 0.75 dpt.

Accordingly, the iso-lines of the surface parameters, namely the surface astigmatism and the mean surface power, are shown In the partial FIGS. 4d and 4e. For a definition of these surface parameters attention is drawn to the introductory explanations.

The example of embodiment illustrated in FIG. 4 satisfies the following individualized wearing conditions:

| | |
|---|---|
| D1x | 4.55 |
| D1y | 4.55 |
| N | 1.597 |
| D | 1.59 |
| DRP | 1.0 |
| PD | 63 |
| HSA | 15 |
| Pantoscopic angle | 0 | wherein
D1x is the power of the front surface in x direction (dpt)
D1y is the power of the front surface in y direction (dpt)
n is the refractive index of the glass material
d is the center thickness of the spectacle lens in mm
DRP is the thickness reduction prism in cm/m
PD is the interpupillary distance
HSA is the vertex distance in mm
The pantoscopic angle of the spectacle lens is given in degrees.

Of course, the features of the present invention may also be applied to the calculation and fabrication of spectacle lenses having two progressive surfaces and/or having (in addition) a varying refractive index.

What is claimed is:

1. Spectacle lens comprising:

a region (distance portion) designed for viewing at greater distances and, in particular, "to infinity";

a region (near portion) designed for viewing at short distances and, in particular, "reading distances";

a progression zone disposed between the distance portion and the near portion, in which the power of the spectacle lens increases from the value at the distance reference point located in the distance portion to the value at the near reference point located in the near portion along a line (principal meridian) curving towards the nose;

wherein the astigmatic deviation along the principal meridian, i.e. the difference between the prescribed and the actual astigmatism, is less than 0.2 dpt;

the maximum astigmatic deviation is less than 1.2 times the addition power (add) which is defined as the difference between the mean "as worn" powers at the distance reference point ($D_{BF}$) and the near reference point ($D_{BN}$);

the maximum astigmatic deviation occurs on the nasal side of the principal meridian; and the value of the maximum astigmatic deviation on the nasal side is at most 0.15 dpt greater than the value of the maximum astigmatic deviation on the temporal side wherein the mean "as worn" power $D_f$ in the region above the centration point $B_Z$, i.e. for y>y(BZ), is given by $$D_f \leq 0.4 \cdot (add) + D_{BF};$$

the "as worn" power DN in the region for which y<<(BZ)−7 mm is given by $$D_f \geq 0.25 \cdot (add) + D_{BF};$$

the spacing xA ($B_F$) of the iso-lines for an astigmatic deviation of 0.5 dpt at the level of the distance reference point, i.e. for y=y($B_F$), is given by $$xA(B_F) \geq 0.06/(add);$$

the spacing xD ($B_F$) of the iso-lines for a deviation of 0.25 dpt from the mean "as worn" power in the distance reference point is given at the level of the distance reference point, i.e. for y=y($B_F$), by $$xD(B_F) \geq 0.04/(add);$$

the spacing xA ($B_F$) of the iso-lines for an astigmatic deviation of 0.5 dpt at the level of the near reference point, i.e. for y=y($B_N$), is given by $$xA(B_N) \geq 0.015/(add);$$

the spacing xA ($B_F$) of the iso-lines for a deviation of 0.25 dpt from the mean "as worn" power in the near reference point is given at the level of the near reference point, i.e. for y=y($B_F$), by $$xD(B_F) \geq 0.015/(add).$$

2. Spectacle lens wherein:

a region (distance portion) designed for viewing at greater distances and, in particular, "to infinity";

a region (near portion) designed for viewing at short distances and, in particular, "reading distances";

a progression zone disposed between the distance portion and the near portion, in which the power of the spectacle lens increases from the value at the distance reference point located in the distance portion to the value at the near reference point located in the near portion along a line (principal meridian) curving towards the nose;

wherein the mean "as worn" power $D_f$ in the region above the centration point $B_Z$, i.e. for y>y(BZ), is given by $$D_f \leq 0.4 \cdot (add) + D_{BF};$$

the "as worn" power DN in the region for which y<<(BZ)−7 mm is given by $$D_f \geq 0.25 \cdot (add) + D_{BF};$$

the spacing xA ($B_F$) of the iso-lines for an astigmatic deviation of 0.5 dpt at the level of the distance reference point, i.e. for y=y($B_F$), is given by $$xA(B_F) \geq 0.06/(add);$$

the spacing xD ($B_F$) of the iso-lines for a deviation of 0.25 dpt from the mean "as worn" power in the distance reference point is given at the level of the distance reference point, i.e. for y=y($B_F$), by $$xD(B_F) \geq 0.04/(add);$$

the spacing xA ($B_F$) of the iso-lines for an astigmatic deviation of 0.5 dpt at the level of the near reference point, i.e. for y=y($B_N$), is given by $$xA(B_N) \geq 0.015/(add);$$

the spacing xA ($B_F$) of the iso-lines for a deviation of 0.25 dpt from the mean "as worn" power in the near reference point is given at the level of the near reference point, i.e. for y=y($B_F$), by $$xD(B_F) \geq 0.015/(add).$$

* * * * *